(12) United States Patent
Faase et al.

(10) Patent No.: US 7,733,553 B2
(45) Date of Patent: Jun. 8, 2010

(54) LIGHT MODULATOR WITH TUNABLE OPTICAL STATE

(75) Inventors: Kenneth Faase, Corvallis, OR (US); Adel Jilani, Corvallis, OR (US); James C. McKinnell, Salem, OR (US); Eric L. Nikkel, Philomath, OR (US); Arthur Piehl, Corvallis, OR (US); James R. Przybyla, Philomath, OR (US); Bao-Sung Bruce Yeh, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 276 days.

(21) Appl. No.: 11/233,225

(22) Filed: Sep. 21, 2005

(65) Prior Publication Data

US 2007/0064295 A1   Mar. 22, 2007

(51) Int. Cl.
*G02F 1/03* (2006.01)
*G02B 27/00* (2006.01)
*G02B 26/08* (2006.01)

(52) U.S. Cl. ............... 359/245; 359/263; 359/298; 359/577

(58) Field of Classification Search ............... 359/245, 359/260–261, 263, 298, 301–303, 317, 318, 359/577
See application file for complete search history.

(56) References Cited

U.S. PATENT DOCUMENTS 4,547,801 A * 10/1985 Haisma et al. ............ 378/98.3

| 5,181,013 | A | 1/1993 | Bagshaw et al. |
| 5,771,321 | A | 6/1998 | Stern |
| 5,835,255 | A | 11/1998 | Miles |
| 5,969,848 | A | 10/1999 | Lee et al. |
| 5,986,796 | A | 11/1999 | Miles et al. |
| 6,025,951 | A | 2/2000 | Swart et al. |
| 6,031,653 | A | 2/2000 | Wang et al. |
| 6,040,936 | A | 3/2000 | Kim et al. |
| 6,040,937 | A | 3/2000 | Miles |
| 6,055,090 | A | 4/2000 | Miles |
| 6,154,591 | A | 11/2000 | Kershaw |
| 6,341,039 | B1 | 1/2002 | Flanders et al. |
| 6,373,632 | B1 | 4/2002 | Flanders |
| 6,381,022 | B1 | 4/2002 | Zavracky |
| 6,384,952 | B1 | 5/2002 | Clark et al. |
| 6,392,341 | B2 | 5/2002 | Jacobsen et al. |

(Continued)

FOREIGN PATENT DOCUMENTS

EP   1139159   10/2001

(Continued)

OTHER PUBLICATIONS

V. Milanovic "MEMS Technologies for Optical Applications" IEEE Dec. 2002.

(Continued)

*Primary Examiner*—Ricky L Mack
*Assistant Examiner*—Dawayne A Pinkney

(57) ABSTRACT

An electronic light modulator device for at least partially displaying a pixel of an image, the device comprising first and second reflectors defining an optical cavity therebetween, the optical cavity being selective of an electromagnetic wavelength at an intensity by optical interference, the device having at least first and second optical states, at least one of the optical states being tunable and the other not tunable.

25 Claims, 4 Drawing Sheets

U.S. PATENT DOCUMENTS

| | | |
|---|---|---|
| 6,400,738 B1 | 6/2002 | Tucker et al. |
| 6,407,851 B1 | 6/2002 | Islam et al. |
| 6,433,917 B1 | 8/2002 | Mei et al. |
| 6,647,171 B1 | 11/2003 | Fu et al. |
| 6,650,455 B2 | 11/2003 | Miles |
| 6,674,562 B1 | 1/2004 | Miles |
| 6,680,792 B2 | 1/2004 | Miles |
| 6,724,785 B1 | 4/2004 | Tucker et al. |
| 6,798,550 B1 | 9/2004 | Wang et al. |
| 6,822,798 B2 | 11/2004 | Wu et al. |
| 6,900,440 B2 | 5/2005 | Reed et al. |
| 7,061,681 B2* | 6/2006 | Anderson et al. ........... 359/579 |
| 7,372,613 B2* | 5/2008 | Chui et al. ................. 359/290 |
| 7,471,444 B2* | 12/2008 | Miles ......................... 359/291 |
| 2001/0003487 A1 | 6/2001 | Miles |
| 2002/0015215 A1 | 2/2002 | Miles |
| 2002/0024711 A1 | 2/2002 | Miles |
| 2002/0005424 A1 | 5/2002 | Miles |
| 2002/0054424 A1 | 5/2002 | Miles |
| 2002/0075555 A1 | 6/2002 | Miles |
| 2002/0080504 A1 | 6/2002 | Atia |
| 2002/0126364 A1 | 9/2002 | Miles |
| 2002/0149828 A1 | 10/2002 | Miles et al. |
| 2003/0025981 A1 | 2/2003 | Ishikawa et al. |
| 2003/0043157 A1* | 3/2003 | Miles ......................... 345/540 |
| 2003/0072070 A1 | 4/2003 | Miles |
| 2004/0027029 A1 | 2/2004 | Borwick, III et al. |
| 2004/0217378 A1* | 11/2004 | Martin et al. ............... 257/200 |
| 2004/0217919 A1 | 11/2004 | Piehl et al. |
| 2004/0218251 A1 | 11/2004 | Piehl et al. |
| 2004/0240032 A1 | 12/2004 | Miles |
| 2005/0122191 A1 | 6/2005 | Nakamura et al. |
| 2006/0077155 A1* | 4/2006 | Chui et al. .................... 345/85 |

FOREIGN PATENT DOCUMENTS

| | | |
|---|---|---|
| EP | 1146325 A2 | 10/2001 |
| EP | 1 473 581 A2 | 11/2004 |
| WO | WO02/091059 | 11/2002 |

OTHER PUBLICATIONS

U. Krishnamoorthi et al. "Dual-mode Micromirrors for Optical Phased Array Applications," 11th Int. Conf. Solid-State Sensors & Actuators, Jun. 2001.

V. Milanovic et al., "Torsional Micromirrors with Lateral Actuators" Transducers '01, Munich, Germany (Jun. 2001).

J. Jerman et al. "A Miniature Fabry-Perot Interferometer . . . " IEEE Solid State Sensor and Actuator Workshop, Jun. 1990 pp. 140-144.

J. Jerman et al. "A Miniature Fabry-Perot Interferometer Fabricated . . . " IEEE Solid State Sensor and Actuator Workshop, Jun. 1988 pp. 16-18.

S. R. Mallinson et al., "Miniature Micromachined Fabry-Perot Interferometers in Silicon," Electronics Ltrs. 23 (20) Sep. 1987, pp. 1041-1043.

* cited by examiner

LIGHT MODULATOR WITH TUNABLE OPTICAL STATE

CROSS-REFERENCE TO RELATED APPLICATION

This application is related to co-pending and commonly assigned application Ser. No. 10/428,247, filed Apr. 30, 2003, the entire disclosure of which is incorporated herein by reference.

TECHNICAL FIELD

This invention relates generally to light modulator devices and more particularly to Fabry-Perot interferometers used for light modulation.

BACKGROUND

There are many applications for light modulator devices that have high spatial and time resolution and high brightness, including applications in displays of information for education, business, science, technology, health, sports, and entertainment. Some light modulator devices, such as digital light-mirror arrays and deformographic displays, have been applied for large-screen projection. For white light, light modulators such as the reflective digital mirror arrays have been developed with high optical efficiency, high fill-factors with resultant low pixelation, convenient electronic driving requirements, and thermal robustness.

Macroscopic scanners have employed mirrors moved by electromagnetic actuators such as "voice-coils" and associated drivers. Micro-mirror devices have used micro-actuators based on micro-electro-mechanical-system (MEMS) techniques. MEMS actuators have also been employed in other applications such as micro-motors, micro-switches, and valves for control of fluid flow. Micro-actuators have been formed on insulators or other substrates using micro-electronic techniques such as photolithography, vapor deposition, and etching.

A micro-mirror device can be operated as a light modulator for amplitude and/or phase modulation of incident light. One application of a micro-mirror device is in a display system. In such a system, multiple micro-mirror devices are arranged in an array such that each micro-mirror device provides one cell or pixel of the display. A conventional micro-mirror device includes an electrostatically actuated mirror supported for rotation about an axis of the mirror into either one of two stable positions. Thus, such a construction serves to provide both light and dark pixel elements corresponding to the two stable positions. For gray scale variation, binary pulse-width modulation has been applied to the tilt of each micro-mirror. Thus, conventional micro-mirror devices have frequently required a high frequency oscillation of the mirror and frequent switching of the mirror position and thus had need for high frequency circuits to drive the mirror. Binary pulse-width modulation has been accomplished by off-chip electronics, controlling on- or off-chip drivers.

Conventional micro-mirror devices must be sufficiently sized to permit rotation of the mirror relative to a supporting structure. Increasing the size of the micro-mirror device, however, reduces resolution of the display since fewer micro-mirror devices can occupy a given area. In addition, applied energies must be sufficient to generate a desired force needed to change the mirror position. Also, there are applications of micro-mirror devices that require positioning of the mirror in a continuous manner by application of an analog signal rather than requiring binary digital positioning controlled by a digital signal. Accordingly, it is desirable to minimize a size of a micro-mirror device so as to maximize the density of an array of such devices, and it is desirable as well to provide means for positioning the micro-mirror device in an analog fashion.

Micro-electromechanical systems (MEMS) are systems which are typically developed using thin film technology and include both electrical and micro-mechanical components. MEMS devices are used in a variety of applications such as optical display systems, pressure sensors, flow sensors, and charge-control actuators. MEMS devices of some types use electrostatic force or energy to move or monitor the movement of micro-mechanical electrodes, which can store charge. In one type of MEMS device, to achieve a desired result, a gap distance between electrodes is controlled by balancing an electrostatic force and a mechanical restoring force.

MEMS devices designed to perform optical functions have been developed using a variety of approaches. According to one approach, a deformable deflective membrane is positioned over an electrode and is electrostatically attracted to the electrode. Other approaches use flaps or beams of silicon or aluminum, which form a top conducting layer. For such optical applications, the conducting layer is reflective while the deflective membrane is deformed using electrostatic force to direct light which is incident upon the conducting layer.

More specifically, MEMS of a type called optical interference devices produce colors based on the precise spacing of a pixel plate relative to a lower plate (and possibly an upper plate). This spacing may be the result of a balance of two forces: electrostatic attraction based on voltage and charge on the plate(s), and a spring constant of one or more "support structures" maintaining the position of the pixel plate away from the electrostatically charged plate. One known approach for controlling the gap distance is to apply a continuous control voltage to the electrodes, where the control voltage is increased to decrease the gap distance, and vice-versa. However, precise gap distance control and maintenance of reflector parallelism may be affected by several factors, including material variations between support structures, misalignment in lithographic methods used in device fabrication, undesired tilt of reflecting surfaces, and other variations. While various light modulator devices have found widespread success in their applications, there are still unmet needs in the field of micro-optical light modulator devices.

BRIEF DESCRIPTION OF THE DRAWINGS

The features and advantages of the disclosure will readily be appreciated by persons skilled in the art from the following detailed description when read in conjunction with the drawings, wherein.

DETAILED DESCRIPTION OF EMBODIMENTS

Figure 1:
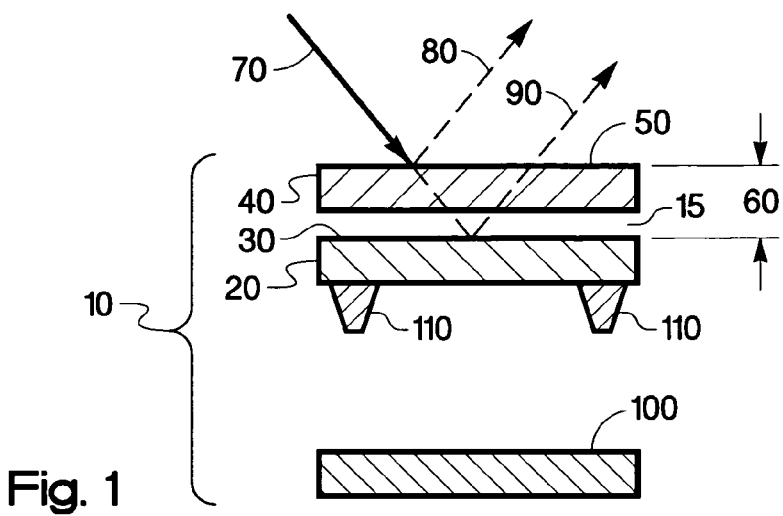
FIG. 1 is a simplified cross-sectional side elevation view of a first embodiment of a light modulator in a first state.

For clarity of the description, the drawings are not drawn to a uniform scale. In particular, vertical and horizontal scales may differ from each other and may vary from one drawing to another. In this regard, directional terminology, such as "top," "bottom," "front," "back," "leading," "trailing," etc., is used with reference to the orientation of the drawing figure(s) being described. Because components of the invention can be positioned in a number of different orientations, the directional terminology is used for purposes of illustration and is in no way limiting.

The term "reflector" is used throughout this description and the accompanying claims to mean a surface that is at least partially reflective of electromagnetic radiation. A surface may be intentionally made only partially reflective to allow a portion of incident light to be transmitted, as is conventionally done in the construction of Fabry-Perot interferometers, for example.

One aspect of the invention provides embodiments of an electronic light modulator device for at least partially displaying a pixel of an image. The device has first and second reflectors defining an optical cavity between them. The optical cavity can select an electromagnetic wavelength at an intensity by optical interference. Embodiments of such devices have at least two optical states. At least one of the two optical states is tunable and the other is not tunable. Various embodiments of the electronic light modulator device may be formed as MEMS devices. The two reflectors may form a Fabry-Perot interferometer. A Fabry-Perot interferometer has at least two substantially parallel surfaces separated by an optical gap, for reflecting electromagnetic radiation such that interference occurs between beams reflected from the parallel reflector surfaces.

Figure 2:
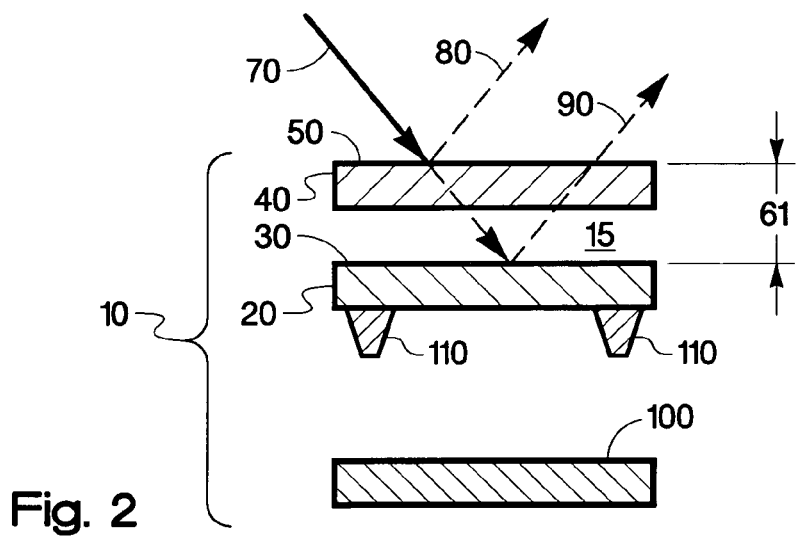
FIG. 2 is a simplified cross-sectional side elevation view of a first embodiment of a light modulator in a second state.
Figure 3:
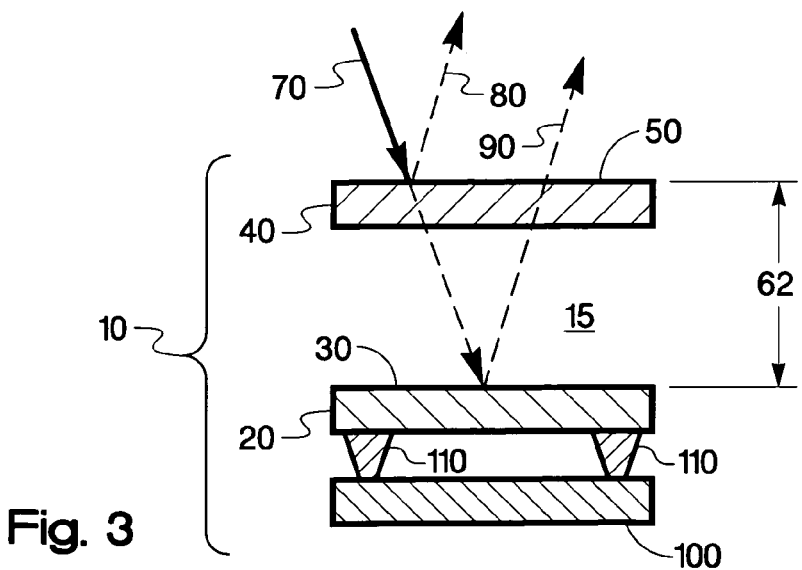
FIG. 3 is a simplified cross-sectional side elevation view of a first embodiment of a light modulator in a third state.

FIGS. 1, 2, and 3 respectively show simplified cross-sectional side-elevation views of a first embodiment of a light modulator device 10 in three different states. As shown in FIG. 1, light modulator device 10 has two reflector plates 20 and 40. Reflector plate 20 has a reflective top surface 30. Reflector plate 40 has a partially reflective top surface 50, which reflects a portion of incident light beam 70 into a first reflected beam 80 and allows another portion of incoming light beam 70 to be transmitted to the reflective top surface 30 of reflector plate 20, where it is reflected into second reflected beam 90. First and second reflected beams 80 and 90 may undergo interference, depending on the optical path difference between the two reflected beams, caused by optical gap 60. If incident light beam 70 were monochromatic, interference between reflected beams 80 and 90 would cause a series of maxima and minima of light intensity as optical gap 60 was varied. If incident light beam 70 consists of white light (polychromatic light), interference between reflected beams 80 and 90 can select a series of colors at respective light intensities as optical gap 60 is varied. Optical gap 60 is varied by varying the spacing 15 between reflector plates 20 and 40.

While, for simplicity and clarity of the description, optical gap distance 60 is shown in the drawings as being characterized by a distance measured perpendicular to reflective surfaces 30 and 50 of plates 20 and 40, those skilled in the art will recognize that the optical path difference between reflected beams 80 and 90 that is effective in causing the interference is measured along the reflected beams themselves and also takes into account in a known manner the refractive index and thickness of any material through which one or both of the interfering beams may be transmitted.

Light modulator device 10 has a control element, electrostatic control plate 100, which may be electrically charged to provide control of optical gap distance 60. Stops 110 prevent reflector plate 20 from contacting control plate 100 (thus preventing stiction) and determine the minimum spacing for mechanical offset of the plates from each other. Stops 110 may be formed of a conventional electrically insulating material (or of a conducting material if the control plate design is modified to prevent shorting of the reflector and control plates). Additional similar stops 110 are shown in FIGS. 4-9.

Light modulator device 10 may be fabricated as a micro-electro-mechanical-system (MEMS) device. Such MEMS devices are typically developed and manufactured using thin film and semiconductor-like technology and include both electrical and micro-mechanical components. For example, many such devices can be formed simultaneously on a silicon wafer in a batch process. In known fabrication methods for MEMS devices, the various elements of each device are formed in fixed spatial relationships until the fabrication is nearly complete and then etching is used to release those particular elements that must be free to move. FIG. 1 shows light modulator device 10 in its initial as-released state, where the optical gap distance is 60 as shown. For FIG. 1, no electrostatic potential is applied to control plate 100; control plate 100 and reflector plate 20 are at the same potential. The state shown in FIG. 1 may be called the "as-released state."

FIG. 2 shows light modulator device 10 in a second state, where the optical gap distance is 61 as shown. In comparison with FIG. 1, light modulator device 10 as shown in FIG. 2 has a larger optical gap distance 61 by virtue of electrostatic attraction between control plate 100 and reflector plate 20 due to an electrostatic potential applied to control plate 100. The state shown in FIG. 2 may be considered a "first optical state," which is tunable by varying the electrostatic potential applied to control plate 100.

FIG. 3 shows light modulator device 10 in a third state, where the optical gap distance is 62 as shown. In comparison with FIG. 2, light modulator device 10 as shown in FIG. 3 has a larger optical gap distance 62 by virtue of increased electrostatic attraction between control plate 100 and reflector plate 20 due to a different electrostatic potential applied to control plate 100. The state shown in FIG. 3 may be considered a "second optical state," which is not tunable by varying the electrostatic potential applied to control plate 100 because stops 110 prevent reflector plate 20 from moving downward from the position shown in FIG. 3.

Thus, another aspect of the invention is an embodiment of a Fabry-Perot interferometer having substantially parallel first and second reflector plates having first and second reflecting surfaces respectively. The first and second reflecting surfaces are spaced apart by a variable optical gap between the first and second reflecting surfaces. At least one of the first and second reflecting plates is movable. This embodiment of a Fabry-Perot interferometer also has at least one fixed electrostatic control plate adapted to control the variable optical gap by application of a control voltage. The control plate is spaced apart from the first reflector plate by a first distance and is spaced apart from the second reflector plate by a second distance smaller than the first distance. For example, the second reflector plate may be disposed between the first reflector plate and the control plate, and the first reflecting plate may be disposed above the second reflecting plate.

In a particular embodiment of the Fabry-Perot interferometer, the variable optical gap is controllable from a rest state (the "as-released" state) with no control voltage applied to a first optical state and a second optical state, as shown in FIG. 1. The optical gap in the rest state may be smaller than the optical gap in the first optical state (shown in FIG. 2), and the optical gap in the first optical state may be smaller than the optical gap in the second optical state (shown in FIG. 3). The first optical state may be electrically tunable, for example, to tune the device to a black state. Thus, this embodiment of the Fabry-Perot interferometer device may be tunable for maximum contrast ratio.

The control voltage of the Fabry-Perot interferometer device embodiments may be continuously controllable by an analog signal or by a digital signal. The digital signal may have a binary value such that a binary zero sets one of the first and second optical states, and a binary one sets the other of the first and second optical states. Alternatively, the digital signal may employ several bits, and conventional digital-to-analog conversion techniques may be used to convert the digital signal to a suitable range of analog electrical potentials.

Various embodiments, such as the embodiments shown in FIGS. 4-9, may have various electrical configurations, described in more detail below. For example, the control plate may be grounded, and the second reflecting plate electrically coupled to a signal source. The first reflecting plate may be held at a fixed electric potential, which may be a potential that is above ground potential. Alternatively, the control plate may be electrically coupled to a signal source, and the first and second reflecting plates may be electrically coupled. The first and second reflecting plates may be electrically grounded.

Figure 4:
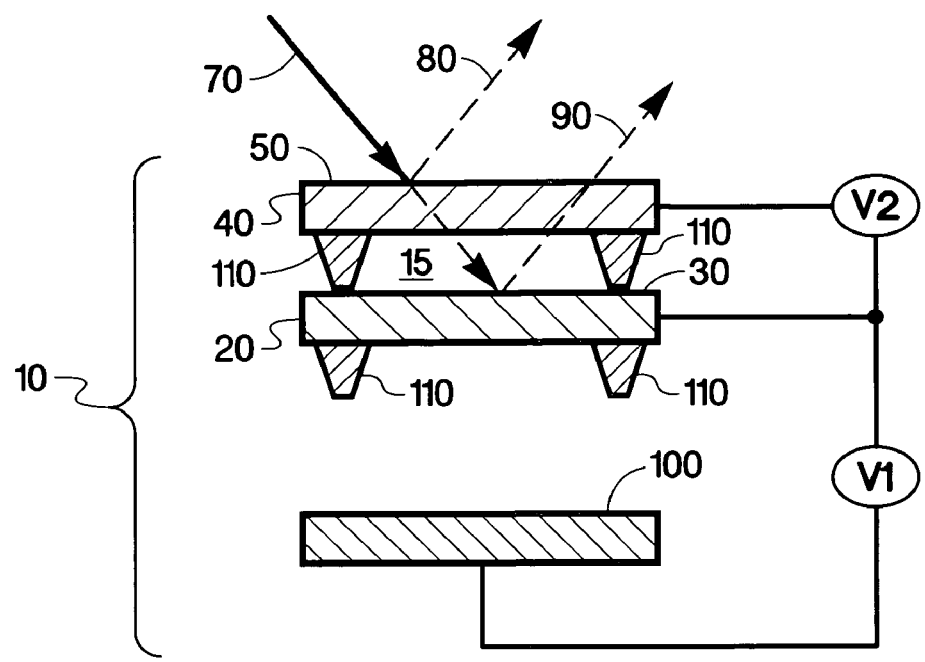
FIG. 4 is a simplified cross-sectional side elevation view of a second embodiment of a light modulator in a first state.
Figure 5:
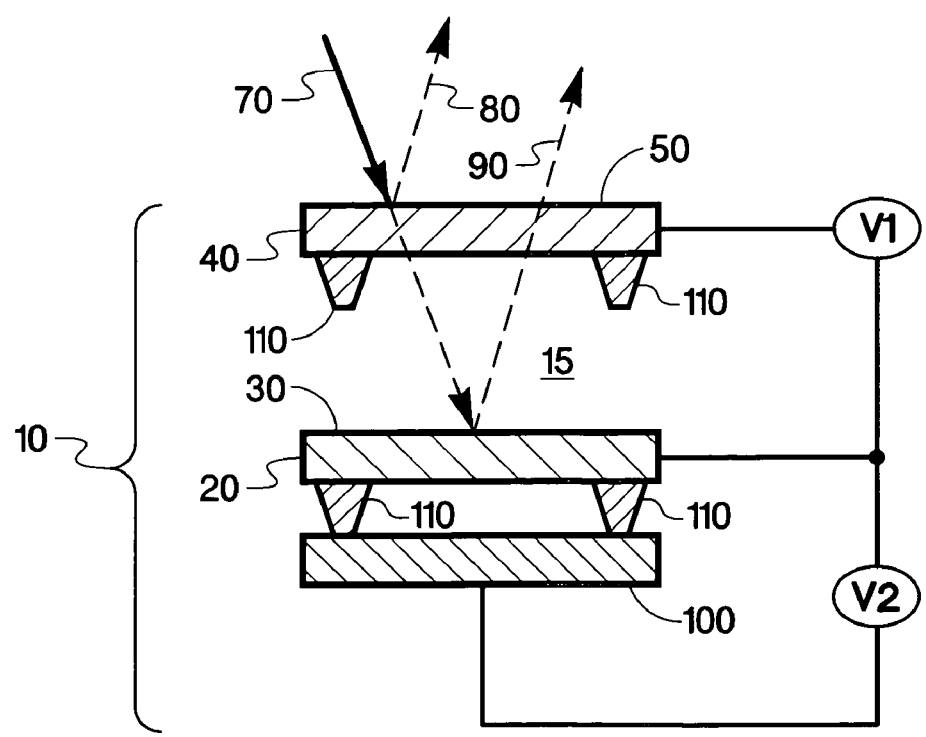
FIG. 5 is a simplified cross-sectional side elevation view of a second embodiment of a light modulator in a second state.

FIGS. 4 and 5 respectively show simplified cross-sectional side-elevation views of a second embodiment of a light modulator device 10 in two different states. As shown in FIG. 4, light modulator device 10 has a voltage V1 applied between control plate 100 and bottom reflector plate 20, while a separate voltage V2 is applied between the bottom reflector plate 20 and the top reflector plate 40. By suitable choices for the potentials V1 and V2, establishing corresponding electric fields, the bottom reflector plate 20 is attracted toward the top reflector plate 40, setting light modulator device 10 in a first state. Conversely, in FIG. 5, the potentials V1 and V2 are chosen such that the bottom reflector plate 20 is attracted toward the control plate 100, setting light modulator device 10 in a second state. The optical gaps are different for the two states. While the same symbols V1 and V2 are used in FIGS. 4 and 5, the numerical values of these voltages are not necessarily the same for the two figures. Such embodiments may be called "dual capacitor" embodiments. FIGS. 4 and 5 illustrate a first version of a dual capacitor embodiment.

Figure 6:
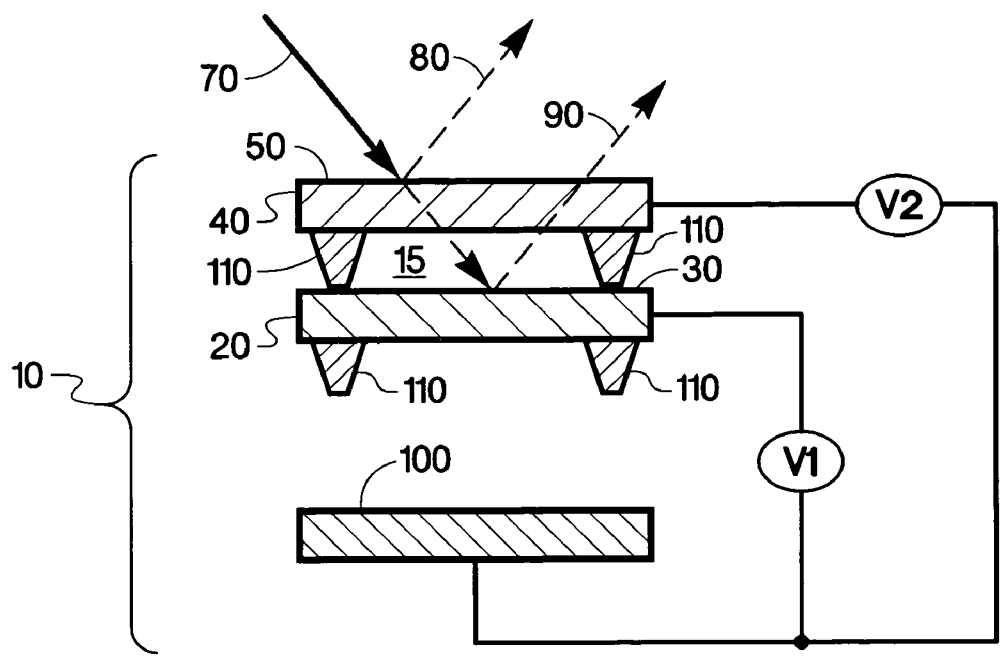
FIG. 6 is a simplified cross-sectional side elevation view of a third embodiment of a light modulator in a first state.
Figure 7:
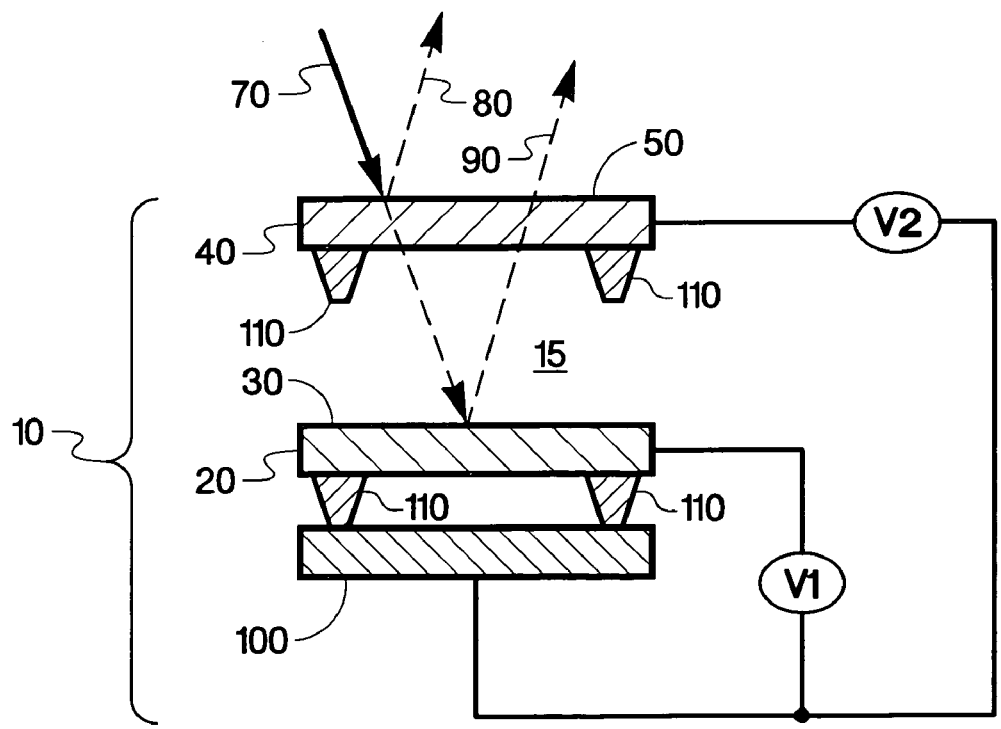
FIG. 7 is a simplified cross-sectional side elevation view of a third embodiment of a light modulator in a second state.

FIGS. 6 and 7 respectively show simplified cross-sectional side-elevation views of a third embodiment of a light modulator device 10 in two different states. FIGS. 6 and 7 illustrate a second version of a dual capacitor embodiment. As shown in FIG. 6, light modulator device 10 has a voltage V1 applied between control plate 100 and bottom reflector plate 20, while a separate voltage V2 is applied between the control plate 100 and the top reflector plate 40. By suitable choices for the potentials V1 and V2, establishing corresponding electric fields, the bottom reflector plate 20 is attracted toward the top reflector plate 40, setting light modulator device 10 in a first state. Conversely, in FIG. 7, the potentials V1 and V2 are chosen such that the bottom reflector plate 20 is attracted toward the control plate 100, setting light modulator device 10 in a second state. The optical gaps are different for the two states. While the same symbols V1 and V2 are used in FIGS. 6 and 7, the numerical values of these voltages are not the same for the two figures, but are varied to provide the appropriate respective positions of bottom reflector plate 20.

Figure 8:
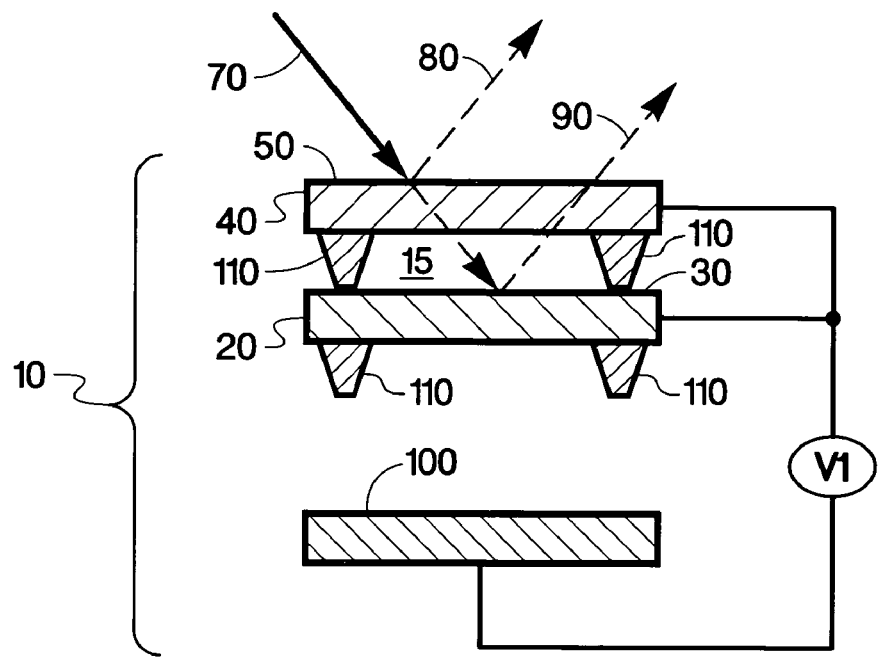
FIG. 8 is a simplified cross-sectional side elevation view of a fourth embodiment of a light modulator in a first state.
Figure 9:
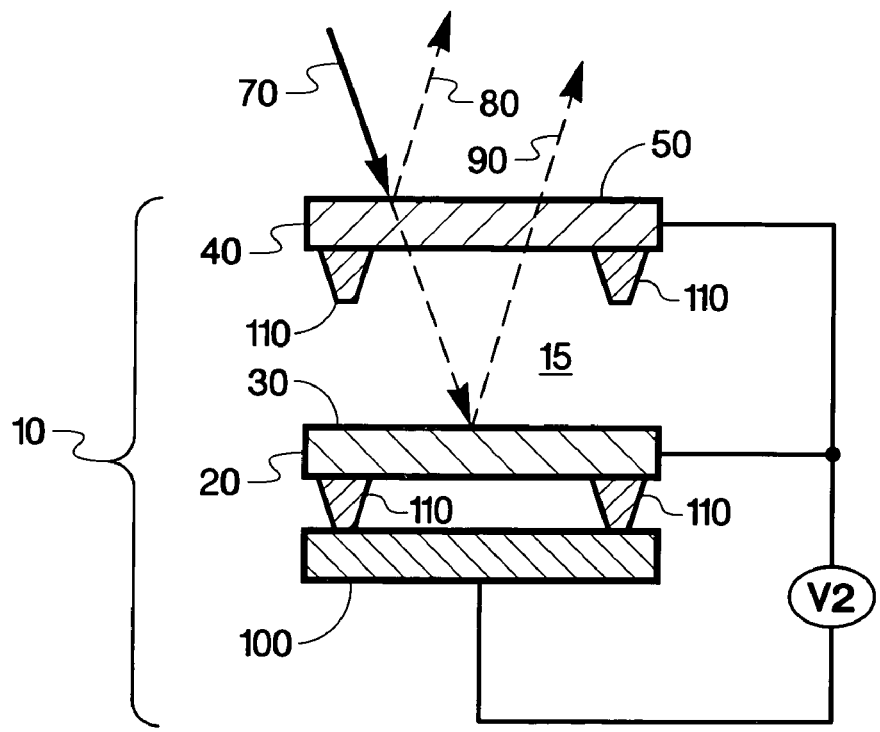
FIG. 9 is a simplified cross-sectional side elevation view of a fourth embodiment of a light modulator in a second state.

FIGS. 8 and 9 respectively show simplified cross-sectional side-elevation views of a fourth embodiment of a light modulator device 10 in two different states. Embodiments such as the embodiment shown in FIGS. 8 and 9 may be called "dual gap" embodiments. As shown in FIG. 8, light modulator device 10 has bottom reflector plate 20 and top reflector plate 40 electrically shorted to maintain them at the same electric potential. In this embodiment, no electrostatic force is needed to drive light modulator device 10 to the first state shown in FIG. 8. This first state may be defined by the position of top reflector plate 40 in its as-released condition, for example (which is not necessarily against the stops 110 of top reflector plate 40, though it may be against the stops as shown). A voltage V1 may be applied in this first state if desired to set a bias on the first optical state, but V1 may be zero volts. The second optical state, illustrated by FIG. 9, has a different voltage V2 applied from control plate 100 to both reflector plates 20 and 40 together, attracting bottom reflector plate 20 downward toward control plate 100. The optical states of FIGS. 8 and 9 have different optical gap distances. Voltage V2 may be set to provide various intermediate optical gap distances. For some dual-gap embodiments, releasing voltage V2 while light modulator device 10 is in the second optical state allows the flexural support elements of light modulator device 10 to return the device to its first optical state.

By combining a number of the electronic light modulator devices 10 (embodiments of the Fabry-Perot interferometers) in an array, embodiments of an optical interference pixel display may be made for displaying multiple pixels simultaneously. Such an array or panel uses multiple light modulator devices made in accordance with the invention, each light modulator device corresponding to a pixel. A number of such arrays or panels may also be combined in a display device so that each pixel displayed is partially displayed by a pixel of each array. For example, in some embodiments, an individual light modulator device may be used to display only one or two colors and black for a pixel. Another corresponding light modulator device in one or more separate panels may be used to display a complete image having the desired hue, saturation, and intensity of each pixel. For example, in a three-panel embodiment (with red, green, and blue RGB panels) displaying a white pixel, the corresponding light modulator devices of all panels would be set to their respective colors and the combination of R, G, and B would form the desired white pixel after being optically combined. Alternatively, or additionally, time-domain combinations may be used. In all such embodiments, each individual physical light modulator device only partially displays the characteristics of a pixel. Thus partial display of a pixel is useful in such embodiments.

Another embodiment of an electronic light modulator device made in accordance with the invention has first and second reflectors defining an optical cavity between them, the optical cavity again being selective of an electromagnetic wavelength by optical interference, and the device having at least first and second optical states, neither of the first and second optical states being tunable by applying an electric potential. The optical states are characterized by first and second optical gaps respectively and the device has a range of intermediate optical gaps between the first and second optical gaps. Any of the intermediate optical gaps is selectable by varying an electric field applied to at least one of the first and second reflectors. Thus the non-tunable first and second optical states represent fixed ends of the achievable optical range in such embodiments.

From another point of view, embodiments of an electronic light modulator device made in accordance with the invention have first and second reflectors defining between them an optical cavity selective of an electromagnetic wavelength by optical interference and has three electrodes. The first electrode is coupled to the first reflector, the second electrode is coupled to the second reflector, and the third electrode is coupled to a control plate. Thus, a number of optical states are selectable by selectively applying an electric potential between at least two of the first, second, and third electrodes. The selectable optical states include at least a first optical state that is tunable and a second optical state that is not tunable.

Embodiments of the light modulators 10 may be fabricated by providing a substrate having at least an insulating surface, depositing and patterning a conductive electrode 100 on the insulating surface, depositing a first layer of sacrificial material, forming a first reflecting plate 20 having a reflective surface 30, depositing a second layer of sacrificial material, forming a second reflecting plate 40 having a surface 50 that is at least partially reflective, and removing the first and second layers of sacrificial material to release at least the second reflecting plate 40. In at least one embodiment, the first reflecting plate 20 may also be released. The insulating surface of the substrate may comprise silicon oxide or silicon nitride, for example. The sacrificial material may comprise amorphous silicon, photoresist, polyimide, or any of a number of other sacrificial materials known in the art of MEMS fabrication. Each of the layers of sacrificial material may be planarized after depositing them, e.g., by chemical-mechanical polishing (CMP). Reflecting plate 20 and flexural elements that support it may be formed of metal, for example. Reflecting surfaces 30 and 50 may be formed of aluminum, for example. Stops 110 may be formed integrally with the reflecting plates.

INDUSTRIAL APPLICABILITY

Device embodiments made in accordance with the invention are useful in display devices that have high spatial and time resolution, high brightness, and a range of colors, with low-power driving requirements. They may also be used in imaging systems such as projectors, in optical addressing applications, and in instrumentation applications.

Although the foregoing has been a description and illustration of specific embodiments of the invention, various modifications and changes thereto can be made by persons skilled in the art without departing from the scope and spirit of the invention as defined by the following claims. For example, additional capacitor pads may be disposed and adapted for fine control of reflective element position.

What is claimed is:

1. An electronic light modulator device for at least partially displaying a pixel of an image, the device comprising first and second reflectors defining an optical cavity therebetween, the first reflector being partially reflective and being disposed at a fixed position, and the second reflector being disposed between the fixed position of the first reflector and a fixed control electrode, the optical cavity being selective of an electromagnetic wavelength at an intensity by optical interference, the device having at least first and second optical states, the first optical state being continuously tunable by moving the second reflector while the first, partially reflective, reflector remains fixed, and the second optical state not being tunable.

2. The electronic light modulator device of claim 1 formed as a MEMS device.

3. The electronic light modulator device of claim 1 wherein the first and second reflectors form a Fabry-Perot interferometer.

4. An optical interference pixel display comprising a plurality of the electronic light modulator devices of claim 1.

5. The electronic light modulator of claim 1, comprising a Fabry-Perot interferometer, wherein the optical cavity is a variable optical gap, the variable optical gap being continuously controllable from a rest state with no control voltage applied to a first optical state and a second optical state, wherein the optical gap in the rest state is smaller than the optical gap in the first optical state, and the optical gap in the first optical state is smaller than the optical gap in the second optical state.

6. The Fabry-Perot interferometer of claim 5, wherein the first optical state is continuously tunable.

7. The Fabry-Perot interferometer of claim 6, wherein the first optical state is tunable to a black state.

8. The Fabry-Perot interferometer of claim 6, wherein the first optical state is tunable for maximum contrast ratio.

9. An optical interference pixel display comprising a plurality of the Fabry-Perot interferometers of claim 6.

10. The Fabry-Perot interferometer of claim 5, wherein the control voltage is continuously controllable by an analog signal.

11. An optical interference pixel display comprising a plurality of the Fabry-Perot interferometers of claim 10.

12. The Fabry-Perot interferometer of claim 5, wherein the control voltage is controllable by a digital signal.

13. An optical interference pixel display comprising a plurality of the Fabry-Perot interferometers of claim 12.

14. The electronic light modulator of claim 1, comprising a Fabry-Perot interferometer, wherein the control electrode is grounded, and the second reflector is electrically coupled to a signal source.

15. The Fabry-Perot interferometer of claim 14, wherein the first reflector is held at a fixed electric potential.

16. The Fabry-Perot interferometer of claim 15, wherein the fixed electric potential is above ground.

17. An optical interference pixel display comprising a plurality of the Fabry-Perot interferometers of claim 15.

18. The Fabry-Perot interferometer of claim 1, wherein the control electrode is electrically coupled to a signal source.

19. The Fabry-Perot interferometer of claim 18, wherein the first and second reflectors are electrically coupled.

20. The Fabry-Perot interferometer of claim 18, wherein the first and second reflectors are electrically grounded.

21. An optical interference pixel display comprising a plurality of the Fabry-Perot interferometers of claim 18.

22. An electronic device for displaying a pixel of an image, comprising in combination:
    means for interference of electromagnetic radiation including at least two substantially parallel means for reflecting the electromagnetic radiation, one of the at least two substantially parallel means for reflecting being partially reflective and being disposed at a fixed position, and
    means for controlling the other of the at least two means for reflecting to form at least two distinct optical states, at least one of the two distinct optical states being continuously tunable by moving the other of the at least two means for reflecting.

23. An optical interference pixel display comprising a plurality of the electronic devices of claim 22.

24. An electronic light modulator device for at least partially displaying a pixel of an image, the device comprising:

a) first and second reflectors defining an optical cavity therebetween, the optical cavity being selective of an electromagnetic wavelength at an intensity by optical interference, and b) first, second, and third electrodes, the first electrode being coupled to the first reflector, the second electrode being coupled to the second reflector, and the third electrode being coupled to a control plate, whereby a number of optical states are selectable by selectively applying an electric potential between at least two of the first, second, and third electrodes, wherein the number of selectable optical states include at least a first optical state that is continuously tunable and a second optical state that is not tunable.

25. An electronic Fabry-Perot interferometer light modulator device for at least partially displaying a pixel of an image, the device comprising:

a) substantially parallel first and second reflector plates having first and second reflecting surfaces respectively, the first reflecting surface being partially reflective and the second reflective surface being fully reflective, the second reflecting plate being movable, the first and second reflecting surfaces being spaced apart by a variable optical gap between the first and second reflecting surfaces, defining a variable optical cavity therebetween, the variable optical cavity being selective of an electromagnetic wavelength at an intensity by optical interference, the device having at least first and second optical states, the first optical state being continuously tunable by moving the second reflecting plate, and the second optical state not being tunable; and b) at least one fixed electrostatic control plate adapted to control the variable optical cavity by application of a control voltage, the control plate being spaced apart from the first reflector plate by a first distance and being spaced apart from the second reflector plate by a second distance smaller than the first distance, whereby the first reflective surface is disposed between the fixed electrostatic control plate and the second reflective surface.

* * * * *